US007788795B2

(12) United States Patent
Etoh et al.

(10) Patent No.: US 7,788,795 B2
(45) Date of Patent: Sep. 7, 2010

(54) METHOD FOR MANUFACTURING A MAGNETIC HEAD

(75) Inventors: Kimitoshi Etoh, Kanagawa (JP); Hisako Takei, Kanagawa-ken (JP); Masayuki Kurita, Ibaraki (JP); Yuji Kumazawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 944 days.

(21) Appl. No.: 11/519,451

(22) Filed: Sep. 11, 2006

(65) Prior Publication Data

US 2007/0064344 A1 Mar. 22, 2007

(30) Foreign Application Priority Data

Sep. 13, 2005 (JP) ............................. 2005-265752

(51) Int. Cl.
*G11B 5/127* (2006.01)
*H04R 31/00* (2006.01)

(52) U.S. Cl. .............. 29/603.13; 29/603.07; 29/603.15; 29/603.18; 216/62; 216/65; 216/66; 360/121; 360/122; 360/317; 451/5; 451/41

(58) Field of Classification Search .............. 29/603.07, 29/603.13–603.16, 603.18; 216/62, 65, 66; 360/121, 122, 317; 451/5, 41
See application file for complete search history.

(56) References Cited

U.S. PATENT DOCUMENTS 6,225,223 B1 * 5/2001 Liu et al. ..................... 438/687

| 6,226,149 | B1 * | 5/2001 | Dill et al. ............... 360/125.43 |
| 6,731,457 | B2 | 5/2004 | Oki et al. |
| 6,898,057 | B2 | 5/2005 | Okai et al. |
| 2003/0223149 | A1 | 12/2003 | Kimura et al. |
| 2004/0008451 | A1 | 1/2004 | Zou et al. |
| 2005/0024779 | A1 | 2/2005 | Le et al. |

FOREIGN PATENT DOCUMENTS

| JP | 2000-235705 | 8/2000 |
| JP | 2001-256614 | 9/2001 |
| JP | 2002-230714 A | 8/2002 |
| JP | 2003-059010 A | 2/2003 |
| JP | 2003-323702 | 11/2003 |
| JP | 2004-134039 A | 4/2004 |

OTHER PUBLICATIONS

Chinese Office Action for Application No. 200610151882.7, dated Oct. 10, 2008, 11 pages total.

* cited by examiner

*Primary Examiner*—Paul D Kim
(74) *Attorney, Agent, or Firm*—Townsend and Townsend and Crew; Rambod Nader

(57) ABSTRACT

A method for manufacturing a magnetic head that is effective for the suppression of thermal protrusion. The magnetic head includes $SiO_2$, Si nitride, or Si oxide as a coil insulator having a low coefficient of thermal expansion and high workability. The coil insulator is arranged at a position away from the air bearing surface and the air bearing surface is made of alumina, making slider processing easy.

6 Claims, 16 Drawing Sheets

| Material | Young's modulus (GPa) | Poisson's ratio | Coefficient of thermal expansion $\times 10^{-6}$ ($K^{-1}$) |
|---|---|---|---|
| AlTiC | 390 | 0.22 | 7.1 |
| Al2O3 | 138 | 0.25 | 7.1 |
| NiFe | 200 | 0.3 | 12.8 |
| Cu | 130 | 0.34 | 15.4 |
| SiO2 | 72.6 | 0.17 | 0.55 |

Fig. 4
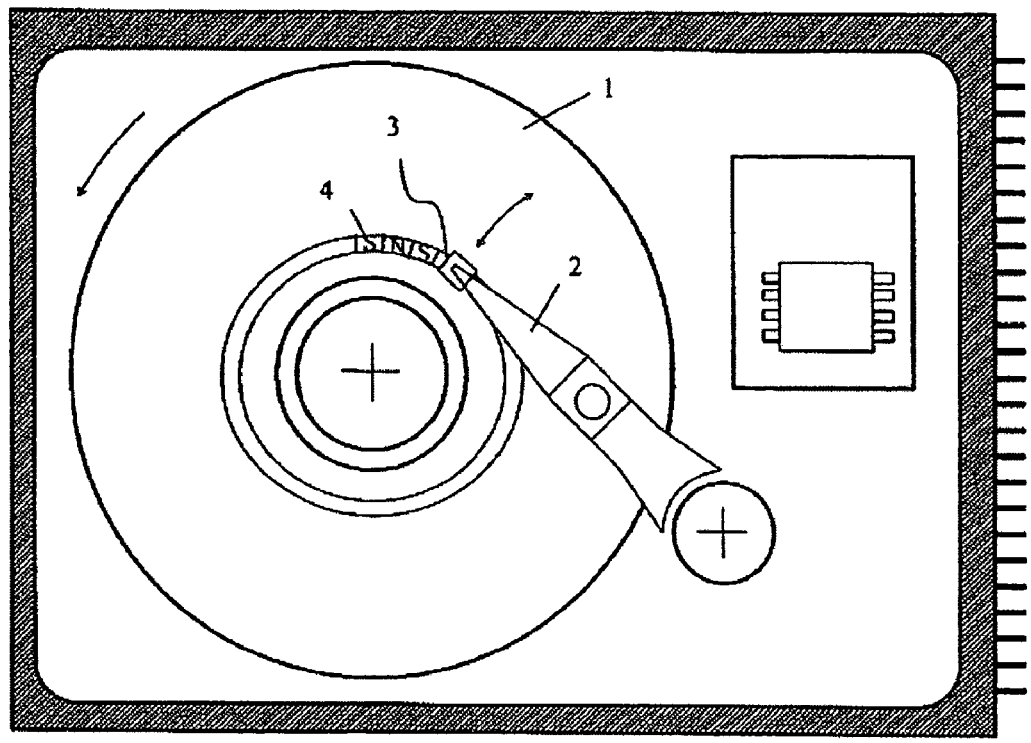
(a)
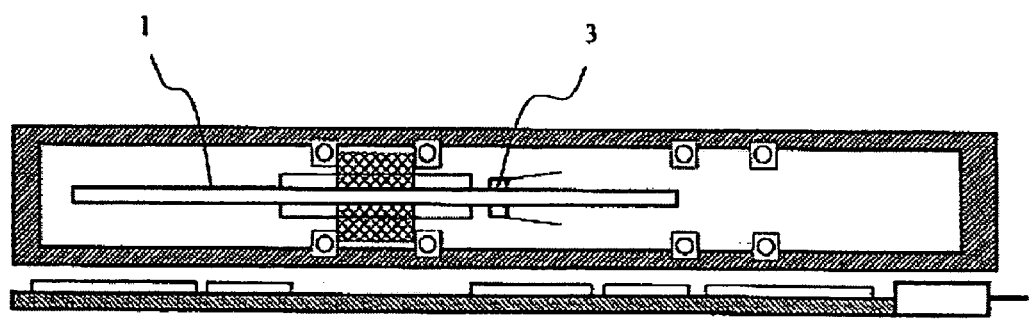
(b)

Fig. 7 (1)
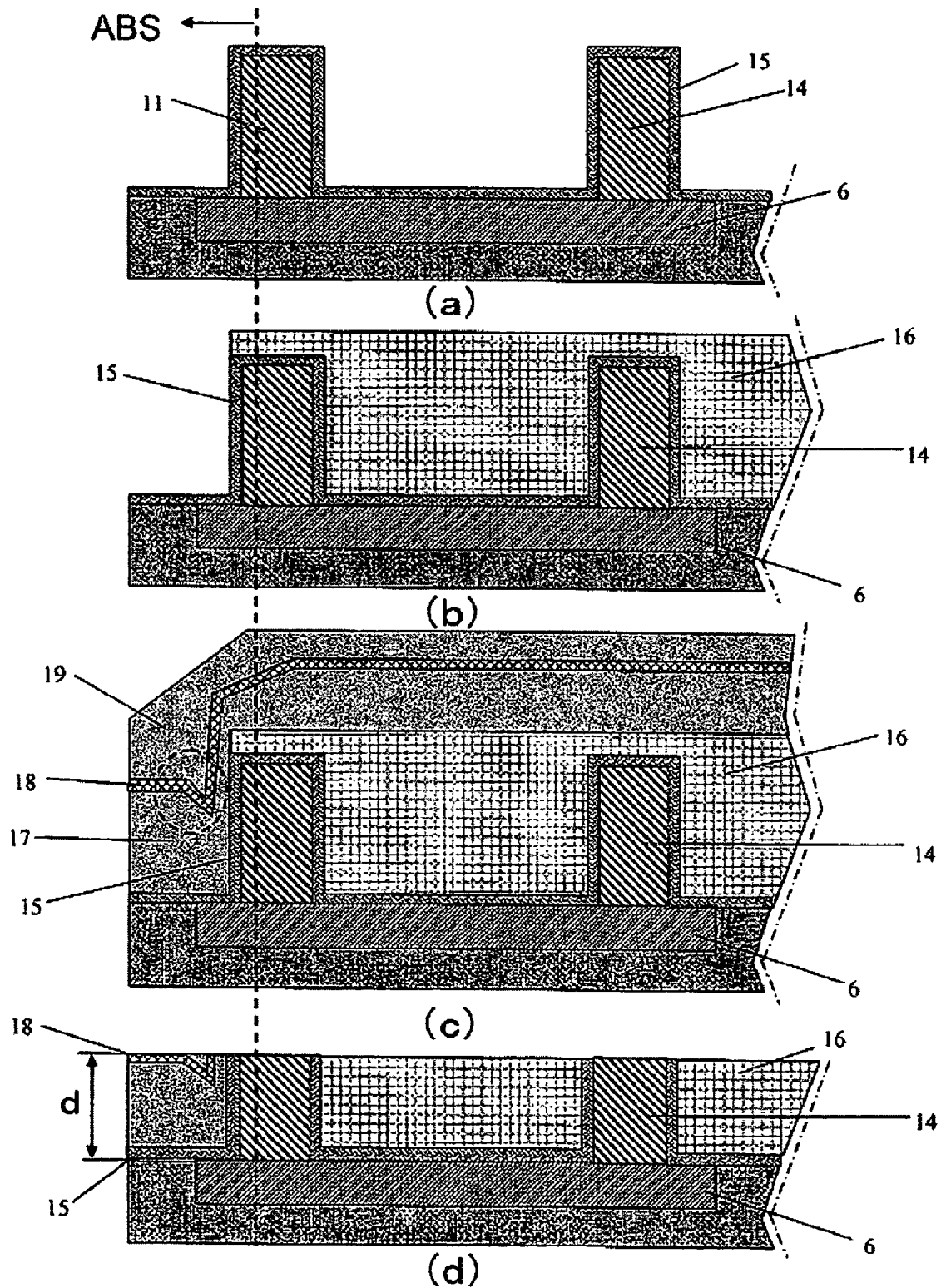

Fig. 7 (2)
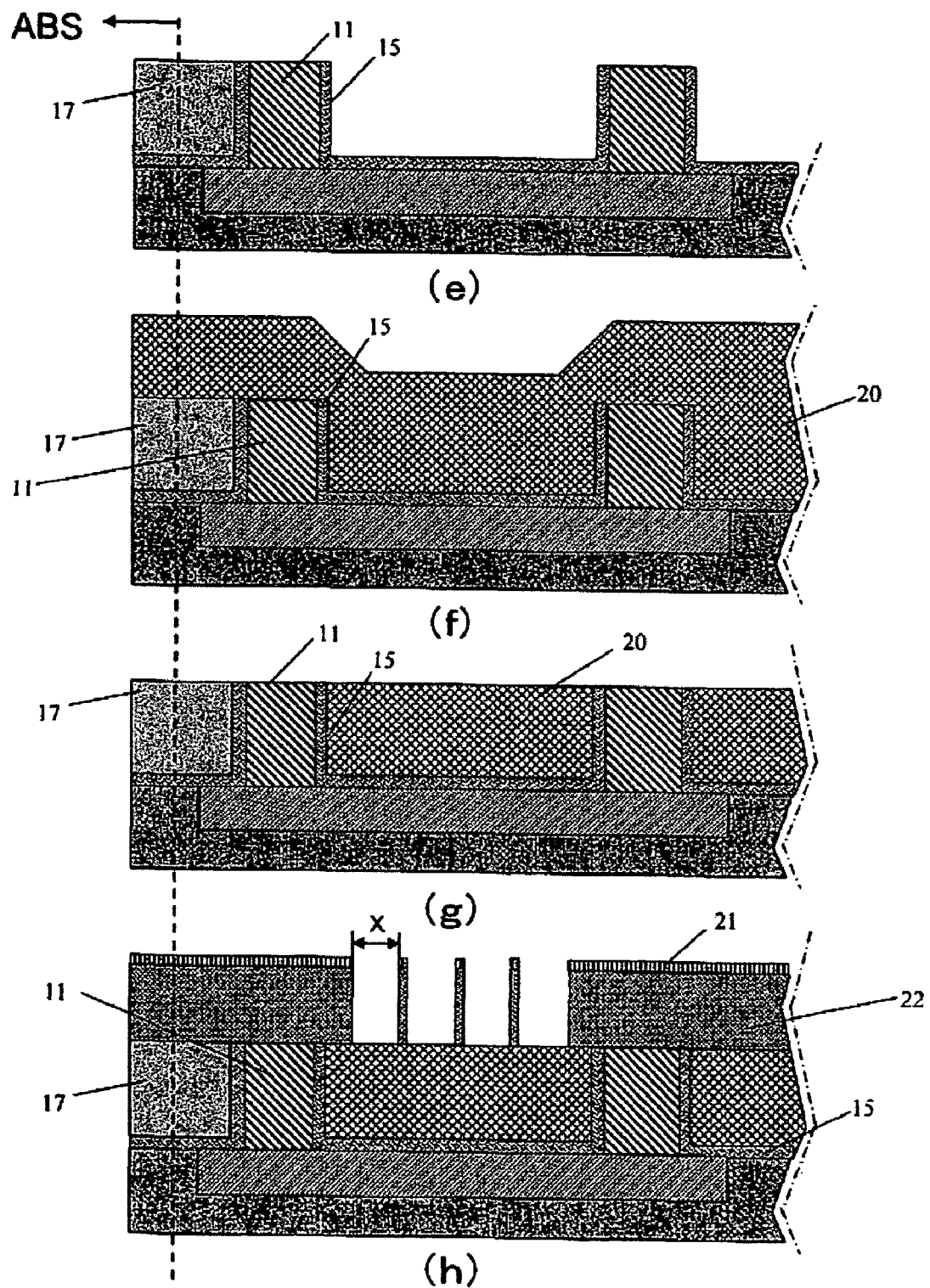

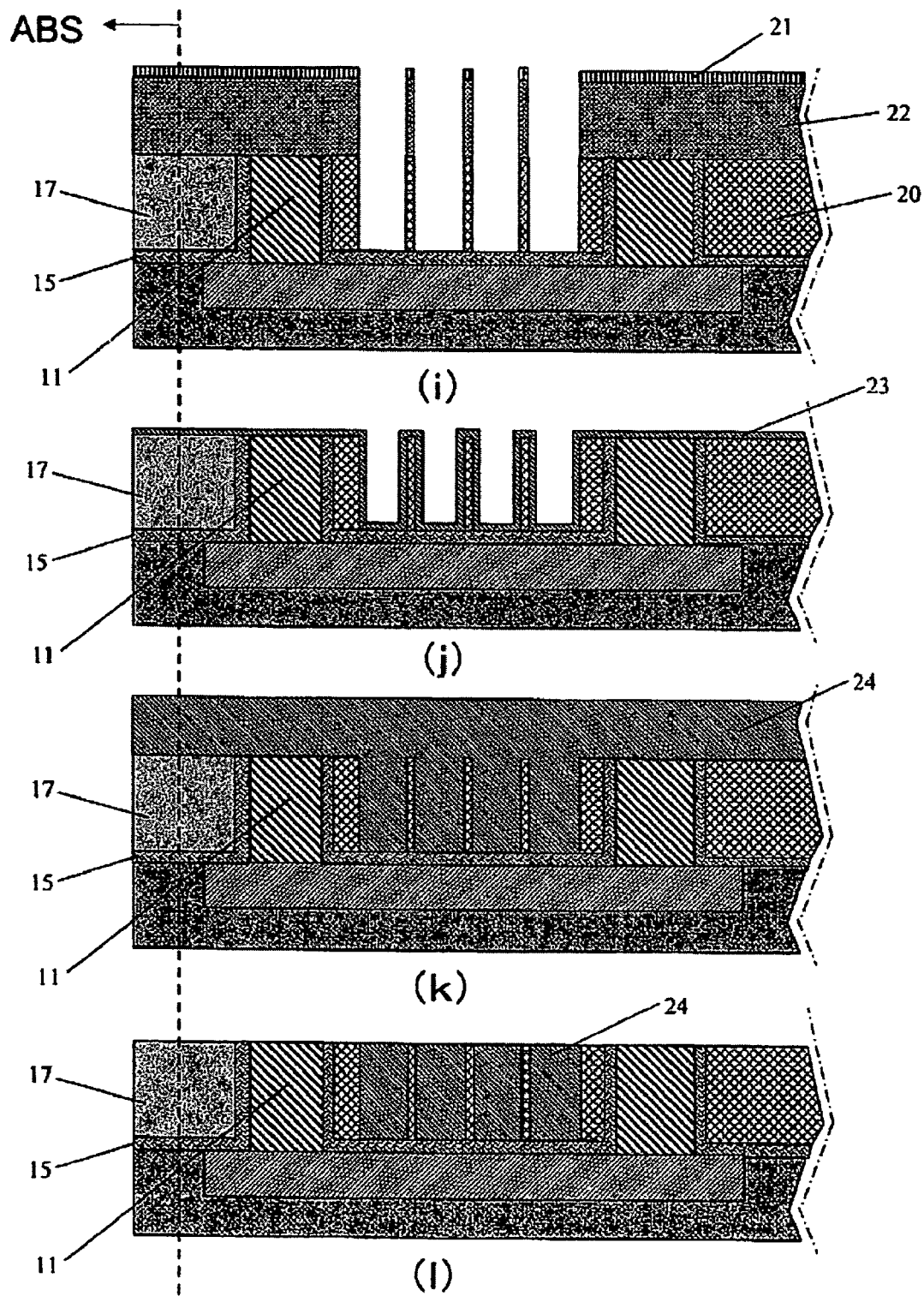
Fig. 7 (3)

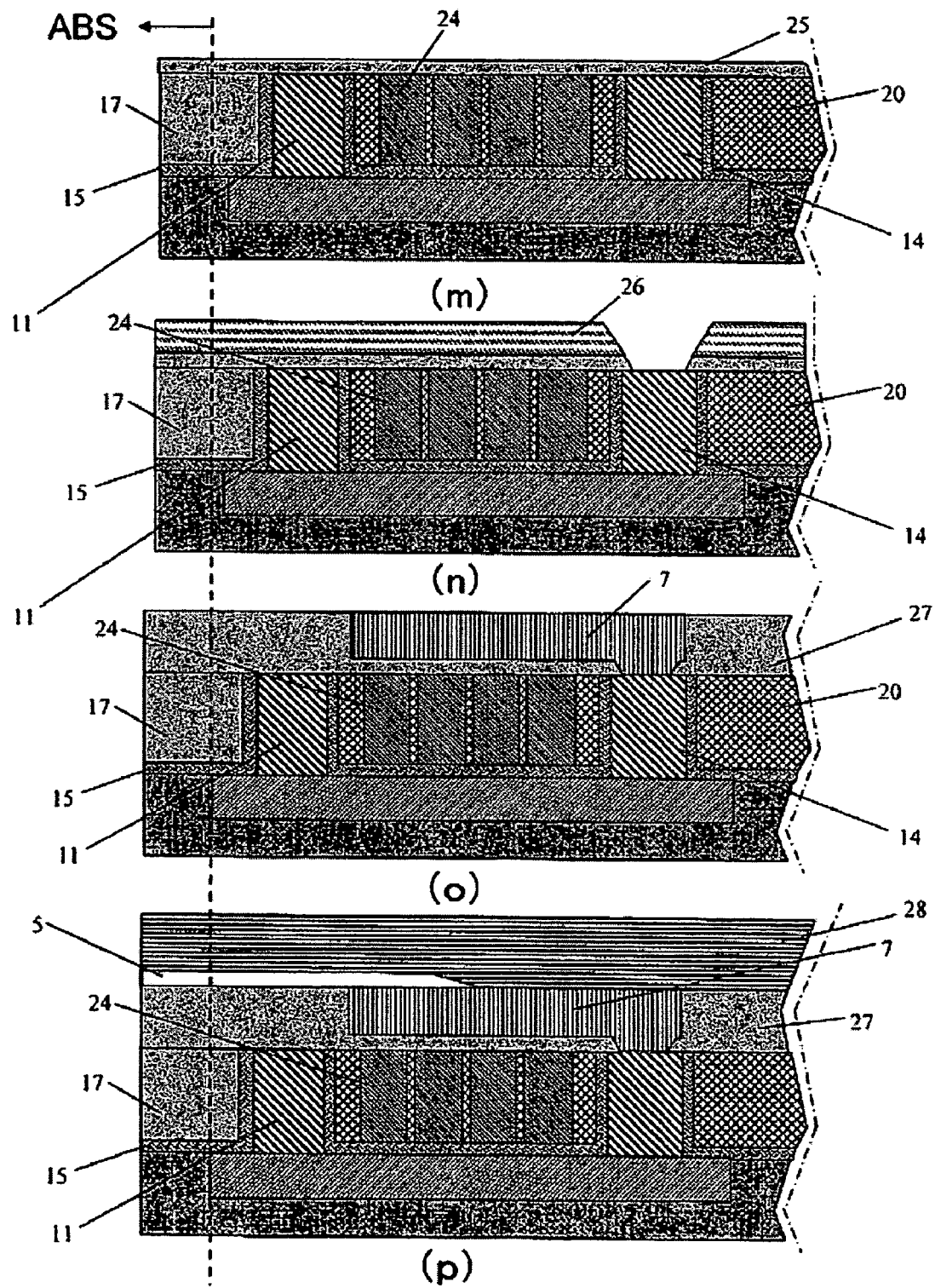
Fig. 7 (4)

Fig. 14
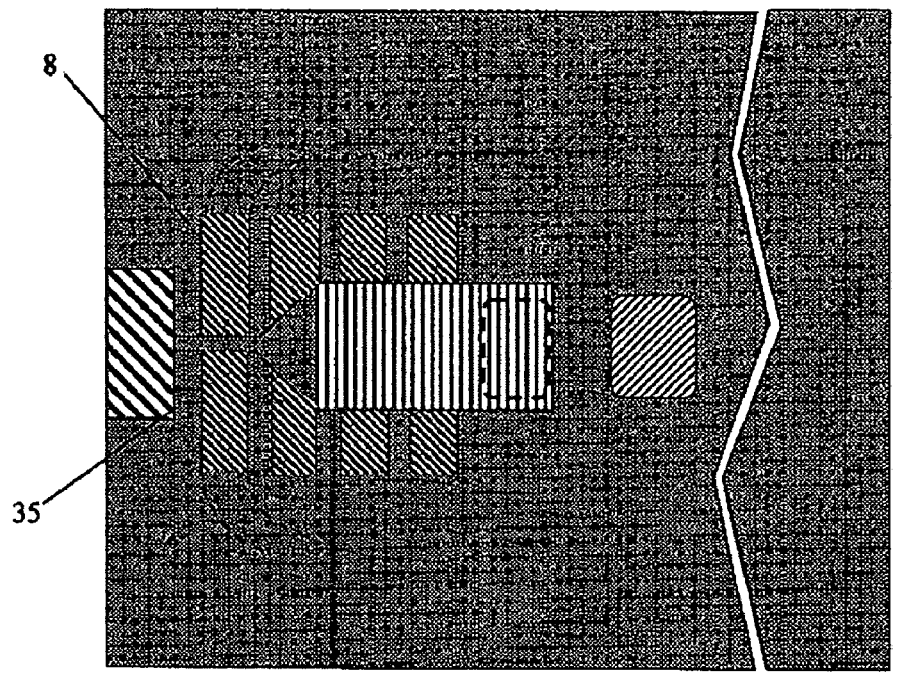
(a)
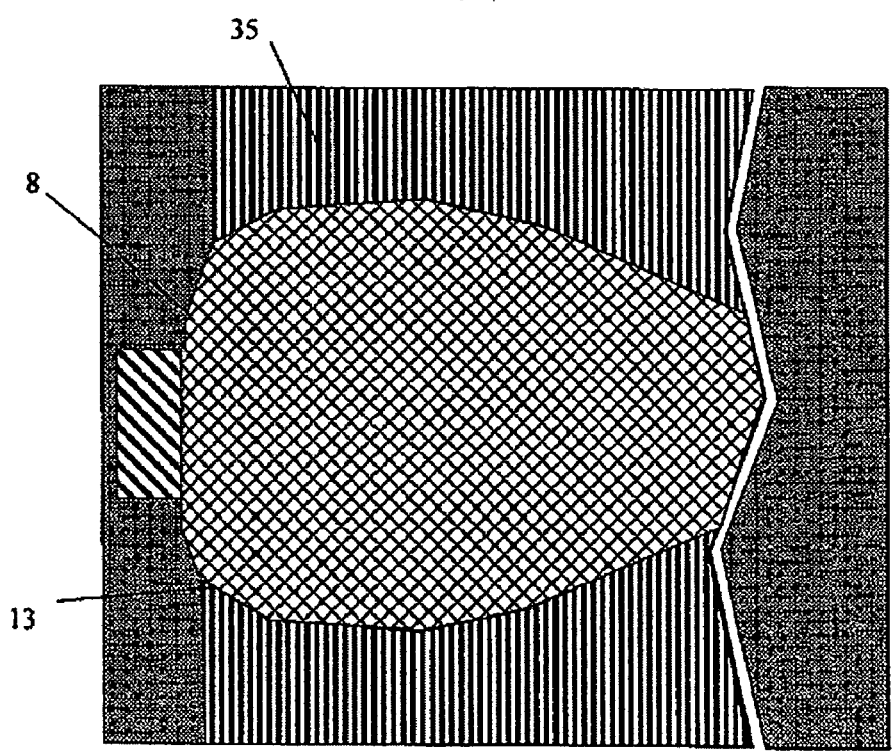
(b)

METHOD FOR MANUFACTURING A MAGNETIC HEAD

CROSS-REFERENCES TO RELATED APPLICATIONS

This application claims priority from Japanese Patent Application No. JP2005-265752, filed Sep. 13, 2005, the entire disclosure of which is incorporated herein by reference.

BACKGROUND OF THE INVENTION

The present invention relates to a thin film magnetic head mounted in a magnetic disk drive or the like for recording and reproduction and a method for manufacturing the same, particularly a method for manufacturing a write head.

As seen in a video recorder equipped with a hard disk drive and a hard disk drive built-in TV, needs for storing images and music in a hard disk drive are rapidly growing. Along with the expansion of the volume of image data, a higher areal recording density is required for a magnetic disk drive. Currently, when the bit length is made small in a thin film magnetic head, thermal fluctuations in the magnetization of a medium occurs, thereby making it impossible to increase the areal recording density. Therefore, technical shift from the current longitudinal recording to perpendicular magnetic recording which is rarely affected by thermal fluctuations is quickly proceeding in order to achieve an areal recording density of 100 Gbit/inch$^2$ or more.

Low floatation is required for a perpendicular recording write head due to the reduced magnetic field strength caused by a reduction in track width like the high areal recording density. The major factor of preventing the low floatation of the magnetic head is a so-called "thermal protrusion phenomenon" (to be referred to as "TPR problem" hereinafter) that a head material for forming a device is warmed by the heat of a coil or static temperature and projects toward a medium. To cope with this TPR, JP-A No. 2004-134039 discloses that two layers of an organic insulator and of an inorganic insulator are used as coil insulating layers and lower and upper parts in contact with the inorganic insulator of the coil have the improved property of radiating heat generated by the coil.

As described above, the TPR problem that the device projects due to a rise in the temperature of the head and the static temperature and comes into contact with the medium is serious. The causes of this problem are (1) a rise in the temperature of the head by heat generated by applying a current to the coil (caused by the coil) and (2) a rise in the temperature of the head by the static temperature. For TPR caused by a coil current, the reduction of the resistance of the head is effective. To reduce the resistance of the head, the sectional area of the coil is increased. That is, a coil having a high aspect ratio must be formed to reduce the coil resistance. As a short magnetic path is effective for high-speed transfer, a coil having a high aspect ratio must be formed in a limited distance. However, a frame plating technique is currently used to form a coil and the height of a resist frame must be reduced to realize a narrow pitch. Since the film thickness of a coil must be at least 1.5 µm from the resistance value of a coil conductor at present, the minimum required thickness of a resist becomes 2.0 µm or more including a plating film thickness distribution. Therefore, it is difficult to reduce the height of the resist frame by the current forming technique.

For TPR caused by the static temperature that the magnetic material projects toward the medium due to a rise in the temperature of the head by the static temperature, there is no absolute countermeasure like TPR caused by the coil. It is merely said that the arrangement of a material having a low coefficient of thermal expansion in the magnetic head is effective according to calculation. However, it is desired to reduce this TPR caused by the environment. Thus the improvement of the head is desired to realize lower floatation.

BRIEF SUMMARY OF THE INVENTION

It is a feature of the present invention to provide a thin film magnetic head which allows for the formation of a coil having a high aspect ratio and low resistance which is effective for the suppression of TPR caused by the static temperature and TPR caused by the coil and a manufacturing method thereof.

According to an aspect of the present invention, $SiO_2$, Si nitride or Si oxide having a low coefficient of thermal expansion is used as an insulator for insulating the coil. The coil insulator is arranged at a position away from the air bearing surface and alumina is provided from the coil insulator to the air bearing surface.

It is recommended that the area for forming the coil insulator should be the same or larger than the area of the coil. It is also recommended to form an adhesion layer between the coil insulator and alumina formed under and above the coil insulator. This is aimed to prevent separation between alumina and the coil insulator by a heat treatment in the subsequent step. Cu, Cr, Ta and Si oxide are effective as adhesives.

In order to reduce the coil resistance, increasing the sectional area of the coil is effective. To this end, a coil having a high aspect ratio must be formed. To form grooves for the coil, it is recommended to pattern an organic or inorganic mask on a coil insulating film and use physical etching such as reactive ion etching. By using dry etching, coil grooves having a high aspect ratio and high perpendicularity can be formed. A plating seed layer made of Cu/Cr or Cu/Ta is formed in the formed coil grooves to manufacture a coil by plating damascene Cu. Damascene Cu plating is effective because it has extremely high padding properties. The Cu plating film formed on the entire surface is polished up to the top of the coil by CMP. Thereafter, the plating seed layer is removed by ion milling or CMP.

According to the present invention, since a material having a low coefficient of thermal expansion and high workability such as $SiO_2$ is used as a coil insulator, the projection of the head magnetic material surrounding the coil can be pinned, thereby making it possible to suppress TPR caused by the static temperature. Since physical etching such as dry etching is used to form the coil frame, a coil having a high aspect ratio can be formed, whereby a low-resistance coil can be thus formed with the result that TPR caused by a coil current can be suppressed.

BRIEF DESCRIPTION OF THE DRAWINGS

FIGS. 4(a) and 4(b) are schematic diagrams of a magnetic recording and reproduction apparatus.

FIGS. 7(1) (*a-d*), 7(2) (*e-h*), 7(3) (*i-l*), and 7(4) (*m-p*) present a process flow diagram showing the manufacture of a perpendicular magnetic write head according to an embodiment of the present invention.

FIGS. 14(*a*) and 14(*b*) show the position of an adhesion layer.

DETAILED DESCRIPTION OF THE INVENTION

An exemplary embodiment of the present invention will be described hereinunder with reference to the accompanying drawings. In the following drawings, similar functional parts are given the same reference symbols.

Figures 1, 2:
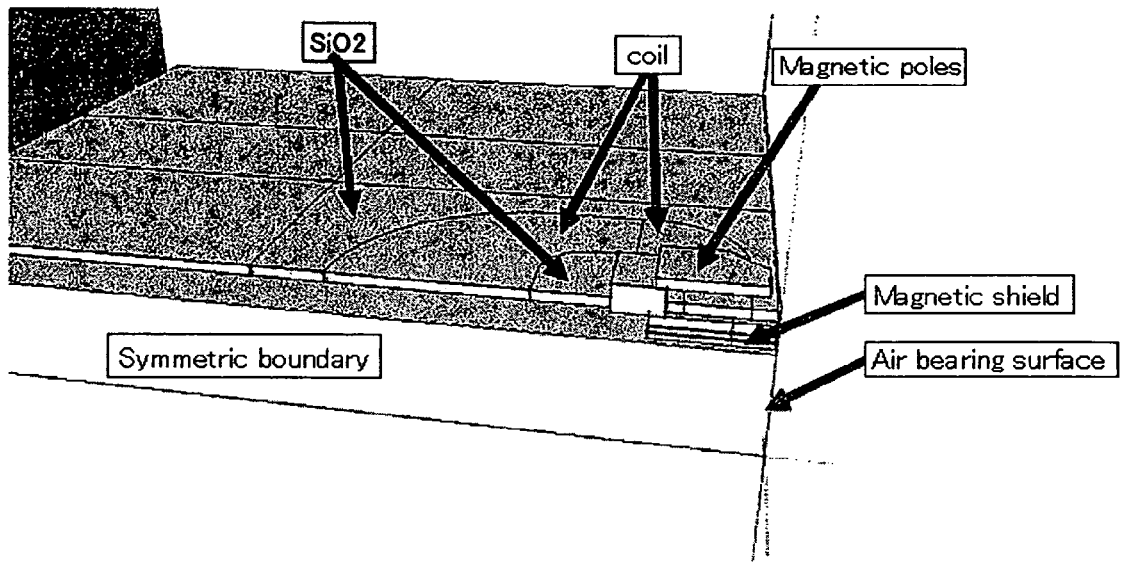
FIG. 1 shows a model used for the calculation of environmental TPR in which $SiO_2$ is used in the coil layer.
FIG. 2 shows the parameter of each material used for calculation.

Low expansion $SiO_2$ is used as a coil insulator to numerically analyze TPR caused by a rise in static temperature by a finite element method. FIG. 1 shows an analytical model near the head. This is a model in which $SiO_2$ is buried around the coil generally made of alumina or resist. In FIG. 1, alumina near the head is not shown so that the internal structure can be easily seen. In this analytical example, the thickness of the coil is 4 μm, the size of the $SiO_2$ area is 180 μm in the track width direction and 190 μm in the floating height direction. The $SiO_2$ area is wider than an ordinary insulator surrounding a coil.

Figure 3:
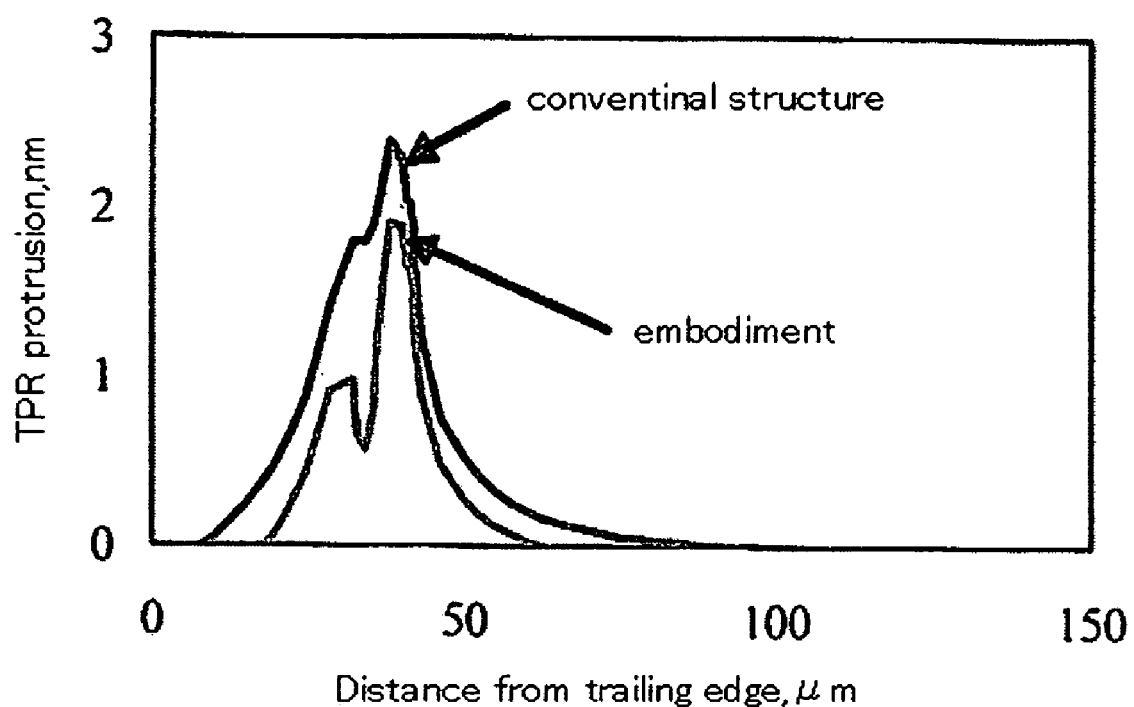
FIG. 3 shows the calculation results of environmental TPR.

FIG. 2 shows the physical property values of each material used for analysis. FIG. 3 shows the TPR analytical results of current alumina and $SiO_2$. The horizontal axis shows distance from the trailing edge and the vertical axis shows TPR deformation (when a 30° C. temperature rise is applied). It is understood from calculation results that the TPR maximum value of the $SiO_2$ buried structure is reduced by about 20% from that of the current alumina buried structure. This is because a pinning effect can be expected from this insulator even at the time of a rise in the static temperature due to the use of an insulator having a low coefficient of thermal expansion as the coil insulator.

In the above analytical example, for simplification, $SiO_2$ is exposed to the air bearing surface. Even in a structure where $SiO_2$ is formed in the inside of alumina and not exposed to the air bearing surface, almost the same TPR reduction effect is obtained. In this case, as alumina is formed between the air bearing surface and the coil insulator, inconvenience caused by slider processing does not occur. Further, since a $SiO_2$ frame is formed by physical etching such as dry etching and a coil is formed by using the damascene technique as will be described hereinafter, a coil having a higher aspect ratio than that of a coil formed by current frame plating can be formed. Therefore, a coil having extremely low resistance can be obtained, which is effective in suppressing the generation of heat from the coil and TPR caused by heat generated from the coil.

FIGS. 4(*a*) and 4(*b*) are schematic diagrams of a magnetic recording and reproduction apparatus, wherein FIG. 4(*a*) is a schematic plan view and FIG. 4(*b*) is a schematic sectional view. In the magnetic recording and reproduction apparatus, a magnetic head 3 fixed to the end of an arm 2 reads and writes a magnetized signal 4 on a magnetic disk 1 driven by a motor.

Figure 5:
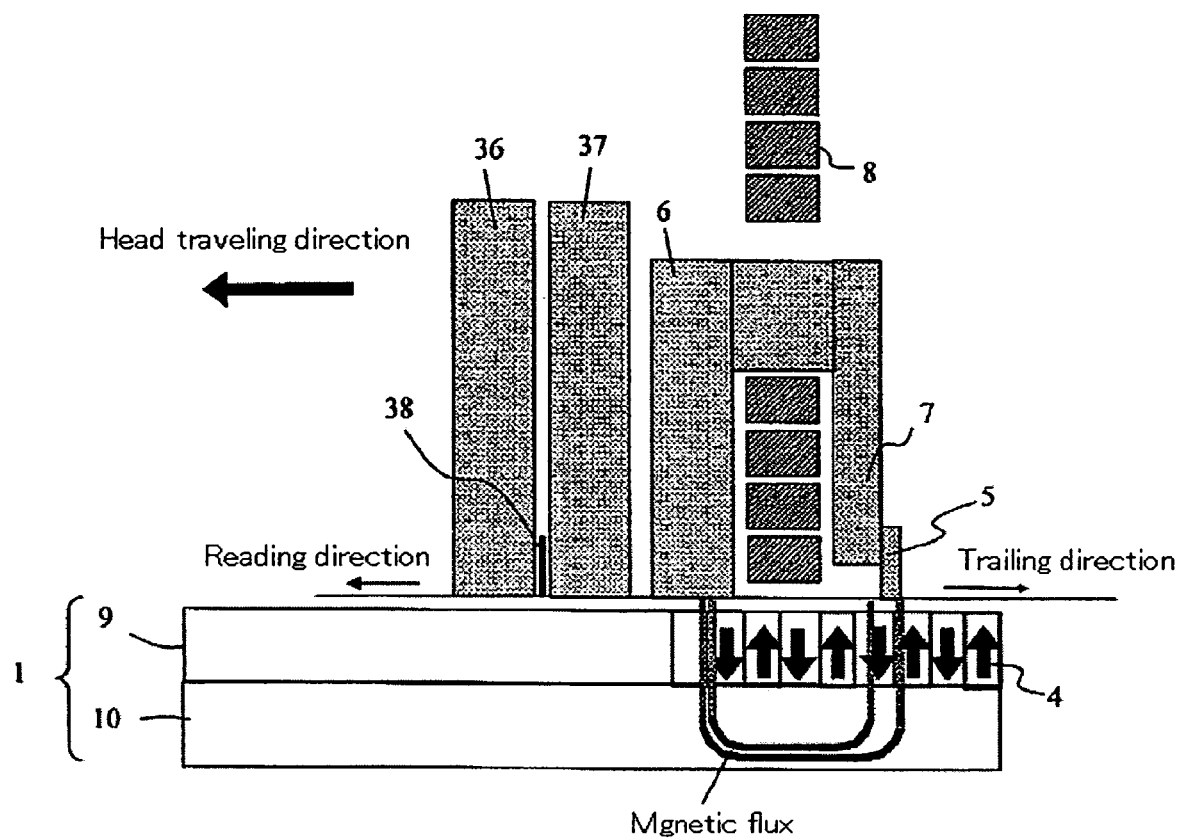
FIG. 5 shows the relationship between a perpendicular magnetic head and a magnetic disk and perpendicular recording.

FIG. 5 is a schematic diagram showing the relationship between the perpendicular recording magnetic head and the magnetic disk. The magnetic head 3 comprises a write head and a read head. The write head generates a magnetic field for recording on the recording layer 9 of the magnetic disk 1 and is a single magnetic pole head comprising a main pole 5, a return pole 6 and a thin film coil 8 crossing a magnetic circuit formed by the main pole 5 and the return pole 6. The read head reads information written on the recording layer 9 of the magnetic disk 1 and comprises a write device 38 such as a GMR (Giant Magneto-Resistive), TMR (Tunneling Magneto-Resistive) or CPP (Current Perpendicular to the Plane) device sandwiched between a pair of write shields 36 and 37. A magnetic field generated from the main pole 5 of the write head forms a magnetic circuit which passes through the recording layer 9 and the soft magnetic backing layer 10 of the magnetic disk 1 and enters the return pole 6 to record the magnetized signal 4 on the recording layer 9.

Figure 6:
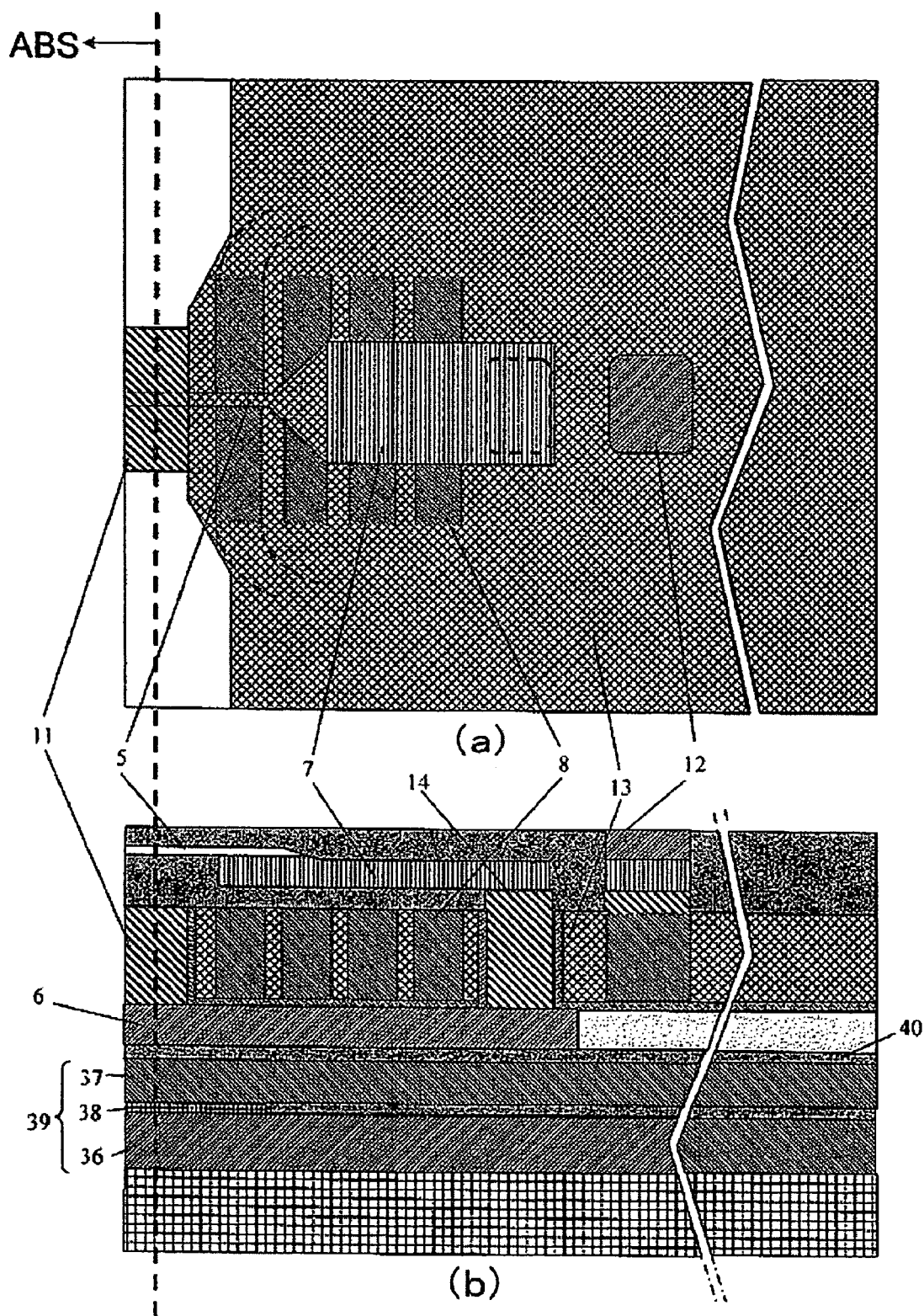
FIGS. 6(a) and 6(b) show the position relationship of a coil insulator in the perpendicular magnetic write head.

FIGS. 6(*a*) and 6(*b*) show an example of the perpendicular magnetic recording head of the present invention in which $SiO_2$ is used in the coil insulating layer 13. FIG. 6(*a*) is a diagram seen from the trailing side and FIG. 6(*b*) is a sectional view of the head when seen from the device height direction.

This perpendicular magnetic recording head comprises a write head and a read head. The read head 39 is composed of a lower magnetic shield 36, an upper magnetic shield 37 and a magnetic sensor 38 such as giant magneto-resistive (GMR) or tunneling magneto-resistive film formed between them. The write head is composed of a return pole 6, a back gap 14, a yoke 7, a main pole 5 and a coil 8 wound round the back gap 14 all of which are formed on a separation layer 40 for separating the write head from the read head.

The present invention relates to a coil and a coil insulating layer. In this embodiment, $SiO_2$ is used in the coil insulating layer 13. $SiO_2$ is arranged at a position away from the air bearing surface as shown in FIG. 6(*a*) and alumina is arranged between the air bearing surface and $SiO_2$ as the coil insulating layer. This is aimed to prevent $SiO_2$ from being chipped at the time of processing a slider (processing the air bearing surface) when $SiO_2$ is exposed to the air bearing surface. The feature of the present invention is that the material of the coil insulating layer is different from the material exposed to the air bearing surface. $SiO_2$ may be arranged on the entire surface of the slider including the winding area of the coil other than the coil portion as shown in FIG. 6(*a*). Alternatively, it may be arranged only in the coil portion.

A detailed description is subsequently given of the method for manufacturing the perpendicular magnetic recording head according to the present invention with reference to the process flow shown in FIGS. 7(1) to 7(4).

FIG. 7(1)(*a*) shows that a pedestal 11 and a back gap 14 are formed by plating on the return pole 6 at the same time and alumina is formed as an insulating layer 15 on these. This insulating layer 15 serves as an RIE (Reactive Ion Etching) stopper film when a $SiO_2$ plating frame is formed. A part shown by a dotted line is an ABS (Air bearing Surface) and a part in the depth direction of the back gap is not shown. The pedestal 11 and the back gap 14 are made of NiFe and as thick as 3.5 μm.

Figure 8:
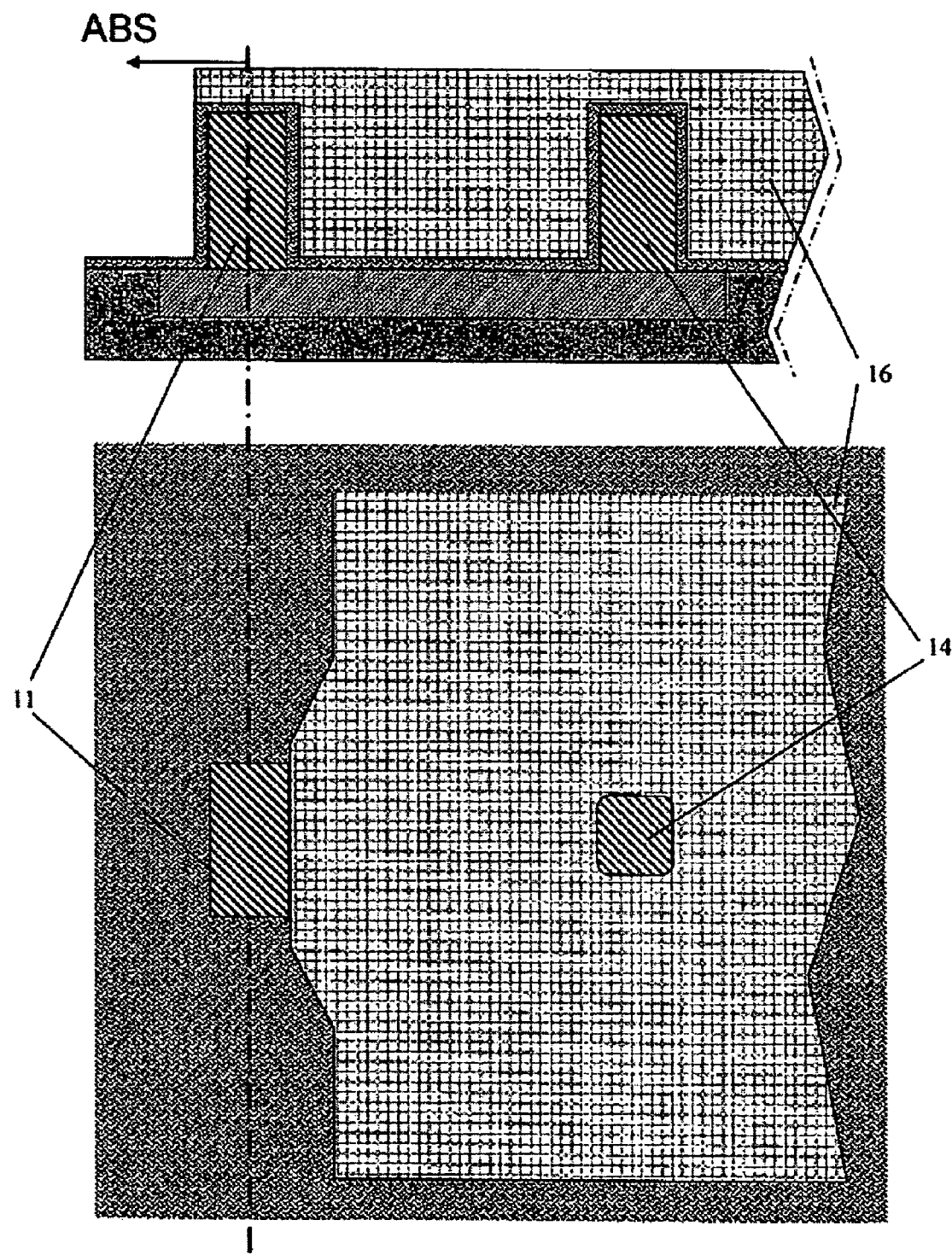
FIG. 8 shows a resist pattern area.

FIG. 7(1)(*b*) shows that a resist pattern 16 is formed up to the rear side of the pedestal 11 by photolithography. FIG. 8 shows this state when seen from the trailing direction. This resist pattern is formed on the entire surface including the coil portion and coil leading area connection terminals as shown in FIG. 8. The resist pattern area can be changed as desired. An i-ray resist or DUV resist may be used as the resist. The thickness of the resist must be larger than the film thickness of the pedestal. A novolak-based positive resist is formed as thick as 4.0 µm and a pattern is formed by using the i-ray stepper of Nikon Corporation at a dose of 1,000 mj/cm$^2$ and a focus of 0.5 µm in this embodiment.

As shown in FIG. 7(1)(c), a three-layer structure consisting of a first alumina layer 17, a CMP stopper layer 18 and a second alumina layer 19 is then formed on the resist pattern 16. This is because the thickness of the first alumina layer 17 must be uniformly controlled so that it becomes the same as the thickness of the coil layer. The alumina layers are formed by bias sputtering. The CMP stopper layer 18 is a stopper layer for CMP in the subsequent step. SiO$_2$ is used as the CMP stopper layer 18. The first alumina layer 17 has a thickness of 3.0 µm, the CMP stopper layer 18 has a thickness of 0.2 µm, and the second alumina layer 19 has a thickness of 1.0 µm. The second alumina layer 19 is intended to fill a recess inevitably made to form the first alumina layer 17 by bias sputtering as shown by ○ in FIG. 7(1)(c). In place of the three-layer structure, alumina may be used to form these layers.

Figure 9:
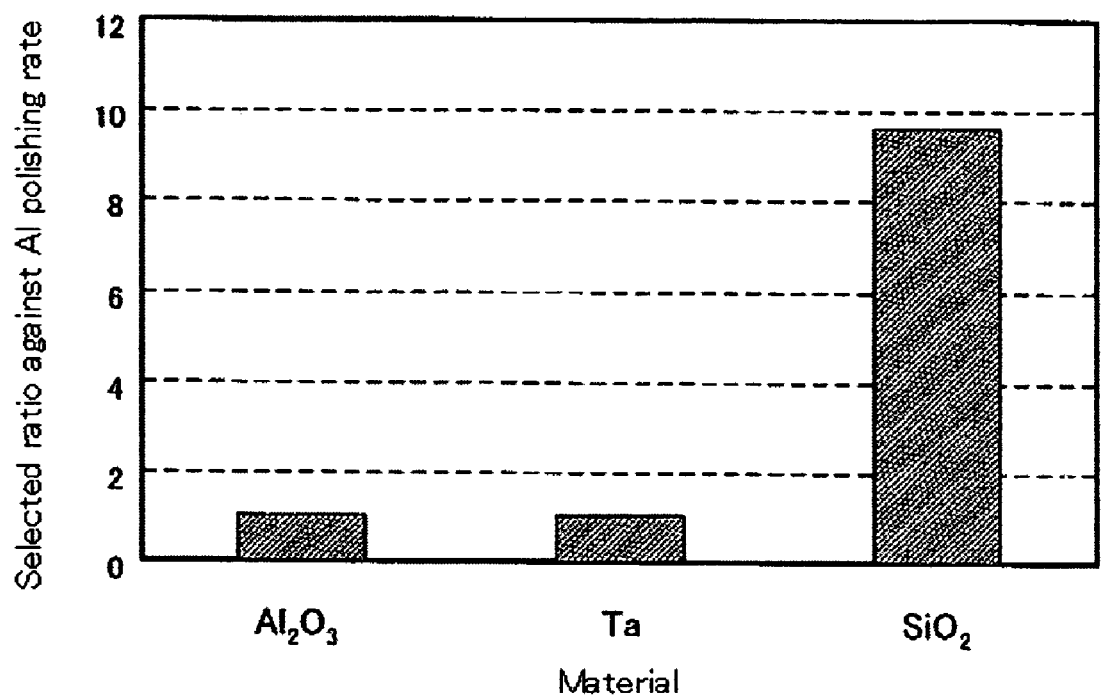
FIG. 9 shows the CMP selection ratio of each material.

Thereafter, the second alumina layer 19 and the resist pattern 16 are polished by CMP at the same time. Alumna abrasive grain-based slurry is used in this step. FIG. 9 shows the result of experiments on the alumina selectivity of the slurry. As for polishing conditions, the CMP apparatus of Speedfem Eyepeck Co., Ltd. was used to carry out polishing for 5 minutes under a load of 200 g/cm$^2$ at a carrier revolution of 70 rpm, a platen revolution of 70 rpm and a slurry flow rate of 100 sccm. Ta which is used as a stopper film in a semiconductor was used as the material of the stopper film, and SiO$_2$ as a hard material and alumina as a reference were polished at the same time. As a result, the polishing rate of Ta was extremely high and high selectivity could not be obtained. On the other hand, SiO$_2$ had an alumina selective ratio of 9.6. Therefore, when CMP was carried out under the above conditions, as shown in FIG. 7(1)(d), the resist was exposed to the surface. The accuracy of the thickness d of alumina in FIG. 7(1)(d) is 3.0 µm±0.2 µm. Since the stopper film is used, a certain thickness distribution can be obtained. The CMP stopper film 18 may remain as it is or may be removed.

When the exposed resist pattern 16 is removed by using an ordinary alkaline resist removing liquid, a mold shape as shown in FIG. 7(2)(e) is obtained. A coil insulating layer 20 is formed in the mold. FIG. 7(2)(f) shows the shape of the coil insulating layer 20. The coil insulating layer 20 is made of SiO$_2$ having a low coefficient of thermal expansion and excellent workability. The SiO$_2$ layer is formed as thick as 4.0 µm by sputtering. CVD may be used in place of sputtering to form the SiO$_2$ layer.

As shown in FIG. 7(2)(g), the SiO$_2$ layer is removed down to the alumina surface by CMP. In CMP of this step, SiO$_2$ is polished by using SiO$_2$-based slurry at a carrier revolution of 300 g/cm$^2$, a platen revolution of 30 rpm and a polishing rate which is an RPM condition of 0.5 µm/min. Since SiO$_2$ has a selection ratio for alumina, its polishing can be stopped at the alumina surface. This step makes it possible to replace SiO$_2$ in the resist pattern area 16 shown in FIG. 7(1)(b). Therefore, alumina can be arranged on the air bearing surface and SiO$_2$ can be arranged at a position away from the air bearing surface by the steps shown in FIGS. 7(1)(a) to 7(2)(g).

Figure 10:
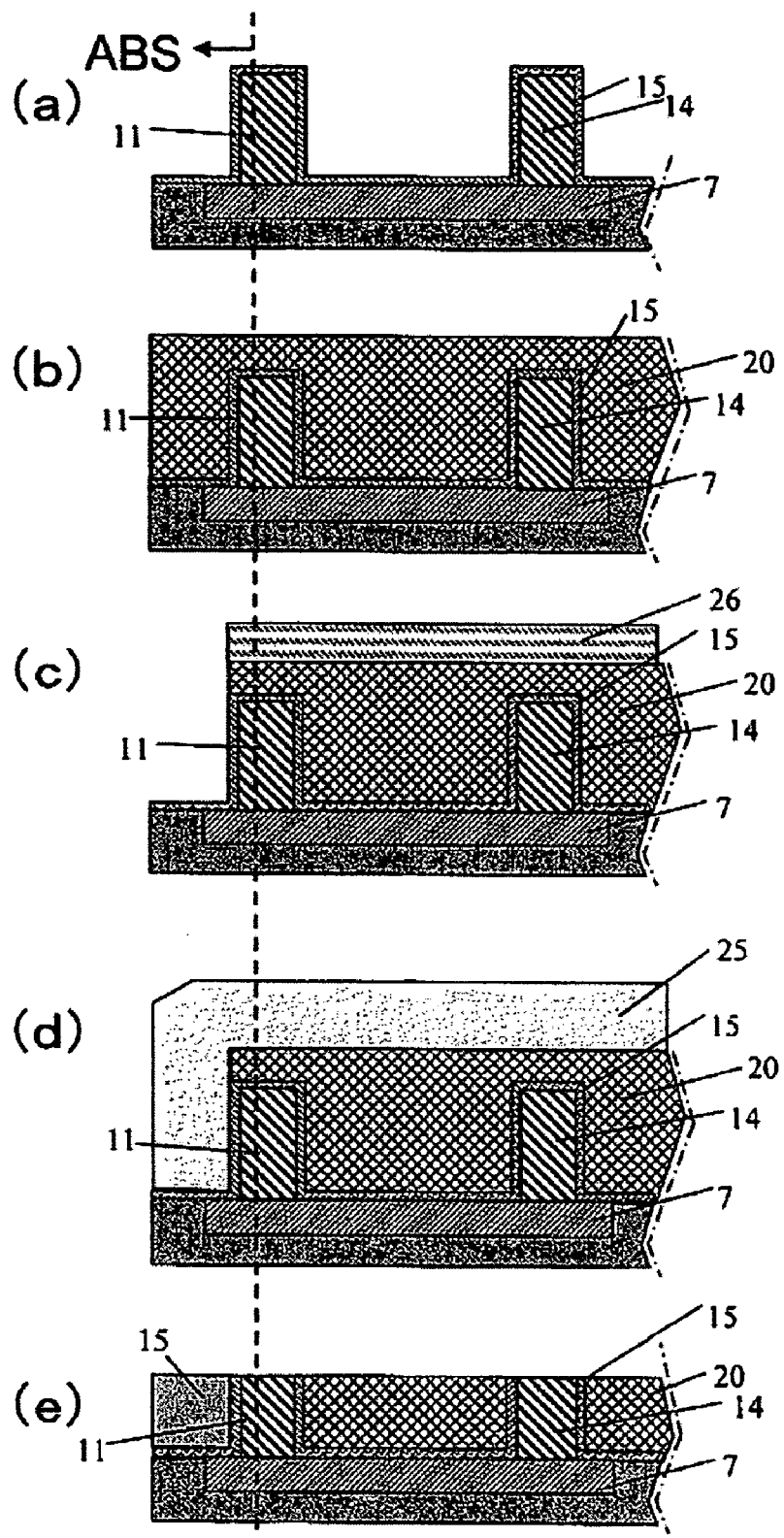
FIGS. 10(*a*) to 10(*e*) show another example of the process flow of the present invention.

A technique different from the technique for replacing SiO$_2$ by using the above resist as a sacrifice layer is shown in FIGS. 10(a) to 10(e). FIG. 10(a) corresponds to FIG. 7(1)(a). From this state, a SiO$_2$ layer is formed as a coil insulating layer 20 by sputtering (FIG. 10(b)). A resist pattern 26 is formed on this SiO$_2$ layer, and SiO$_2$ on the pedestal side is removed by dry etching using a fluorine-based gas such as CF$_4$ or CHF$_3$ (FIG. 10(c)). Thereafter, as shown in FIG. 10(d), an alumina layer 25 is formed on the entire surface, and alumina, SiO$_2$ and NiFe are polished by CMP at the same time, whereby alumina can be arranged on the air bearing surface shown in FIG. 10(e) and SiO$_2$ can be arranged at a position away from the air bearing surface.

A description is subsequently given of the coil forming step. As shown in FIG. 7(2)(h), a double-layer resist consisting of an upper layer resist 21 and an under layer resist 22 is used as a SiO$_2$ etching mask. The upper layer resist 21 is a DUVSi-containing resist and the under layer resist 22 is an organic resin containing no photosensitive material. The upper layer resist 21 is an etching mask for the under layer resist 22. The under layer resist 22 serves mainly as a SiO$_2$ etching mask. The film thickness of the upper layer resist 21 is 0.6 µm and the film thickness of the under layer resist 22 is 2.5 µm. First, a coil pattern is formed on the upper layer resist 21 by using a KrF excimer laser exposure apparatus. The coil width X shown in FIG. 7(2)(h) is 0.75 µm. Thereafter, etching is carried out by using the upper layer resist 21 and a high-density plasma RIE apparatus. The under layer resist is etched very perpendicularly by using O$_2$ as an etching gas at a flow rate of 40 sccm, a pressure of 0.4 Pa and Rf=200 W/Rbias=100 W. The selection ratio for the upper layer resist 21 of the under layer resist 22 is 18 when etching is carried out under the above conditions.

SiO$_2$ is etched by using this resist coil mask and the high-density plasma etching apparatus. SiO$_2$ is etched very perpendicularly by using CHF$_3$ as an etching gas at a flow rate of 40 sccm, a pressure of 1.6 mTorr and Rf=400 W/Rbias=100 W. As shown in FIG. 7(3)(i), a coil frame having an aspect ratio of 4 can be obtained. Thus, the coil frame having a high aspect ratio can be formed by a dry etching technique.

Thereafter, a plating seed layer 23 as shown in FIG. 7(3)(j) is formed on this SiO$_2$ coil frame. This plating seed layer is preferably made of Cu/Cr or Cu/Ta. The thickness of this plating seed layer 23 should be 100 nm or more. This is aimed to prevent the breakage of the plating seed layer caused by the coil grooves. In this step, the thickness of the coil seed layer is 200 nm.

After the formation of the plating seed layer 23, a Cu plating layer 24 is formed by using damascene Cu plating as shown in FIG. 7(3)(k). In FIG. 7(3)(k) and et seq., the plating seed layer 23 on both sides of the SiO$_2$ frame is not shown. In this step, the Cu plating layer 24 is as thick as about 4.0 µm.

As shown in FIG. 7(3)(l), Cu formed by plating is then polished up to the top of the coil frame by CMP. In this step, Si-based slurry which is generally used for semiconductors is used as slurry. As polishing conditions, a load of 300 g/cm$^2$, a carrier revolution of 25 rpm, a platen revolution of 30 rpm and a slurry flow rate of 100 sccm are used. Since the slurry used in this step does not etch Cr or Ta as an adhesive material for the plating seed layer, it serves as a CMP stopper film. Since this seed layer is a conductive layer, ion million, reactive ion etching or polishing with slurry for polishing Cr or Ta may be used.

Figure 11:
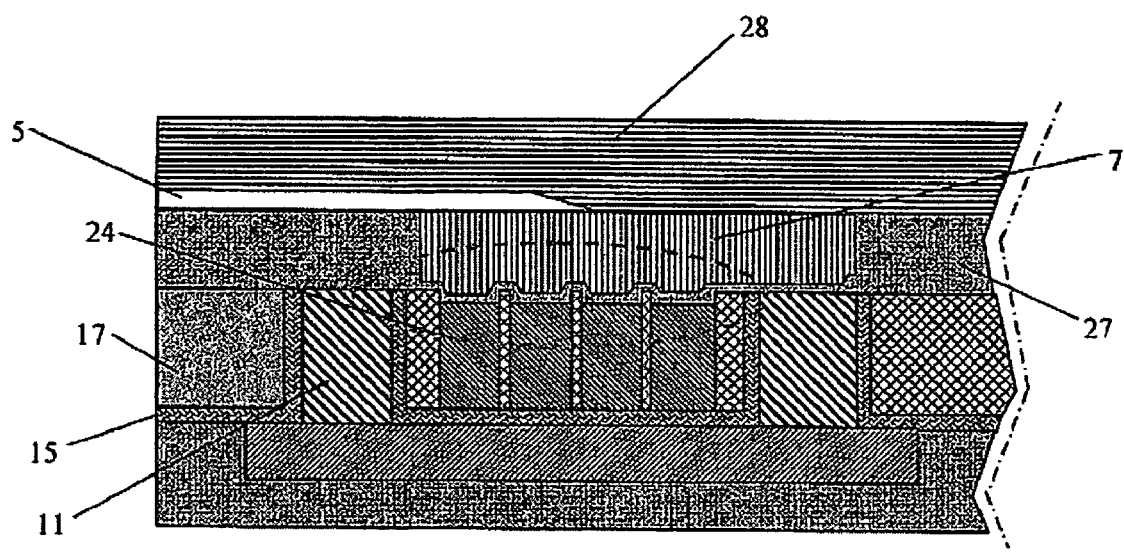
FIG. 11 is a sectional view of a perpendicular magnetic write head manufactured by removing a plating seed layer by ion milling.

Since plated Cu is also physically milled at the same time only when ion milling is used, steps are formed between the SiO$_2$ coil frame and Cu. Therefore, as these steps of this portion are transferred to the lower part of the yoke 7, a head as shown in FIG. 11 is obtained in the end.

Figure 12:
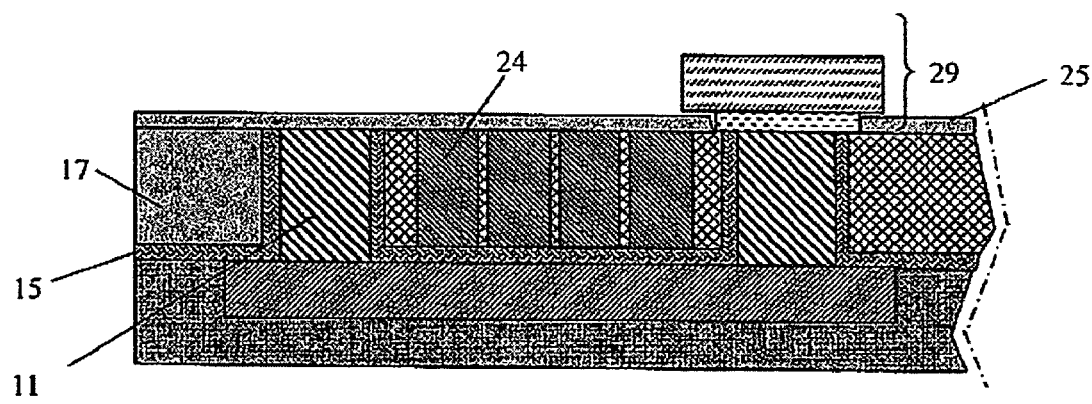
FIG. 12 is a sectional view when a connection portion of a back gap is formed by a lift-off method.

As shown in FIG. 7(4)(m), an alumina layer as a coil upper insulating layer 25 is then formed. The thickness of the alumina layer is 0.3 µm. As shown in FIG. 7(4)(n), a resist 26 is formed on the alumina layer, and alumina on the back gap is removed by ion milling. As shown in FIG. 7(4)(n), alumina on the back gap may be removed by ion milling using a resist mask. Alternatively, as shown in FIG. 12, a lift-off mask 29 may be used to form an alumina layer as the coil upper insulating layer 25.

After the yoke 7 is formed and flattening alumina 27 is formed on the yoke 7 as shown in FIG. 7(4)(o), flattening CMP is carried out to form a main pole. Thereafter, as shown in FIG. 7(4)(p), the main pole 5 is formed on the yoke 7, and protective alumina 28 is further formed. The process is concluded by this step.

The head structure of the present invention in which the $SiO_2$ layer is used as the coil insulating layer has been described as above. TPR is suppressed by this structure, thereby providing a highly reliable head.

Figure 13:
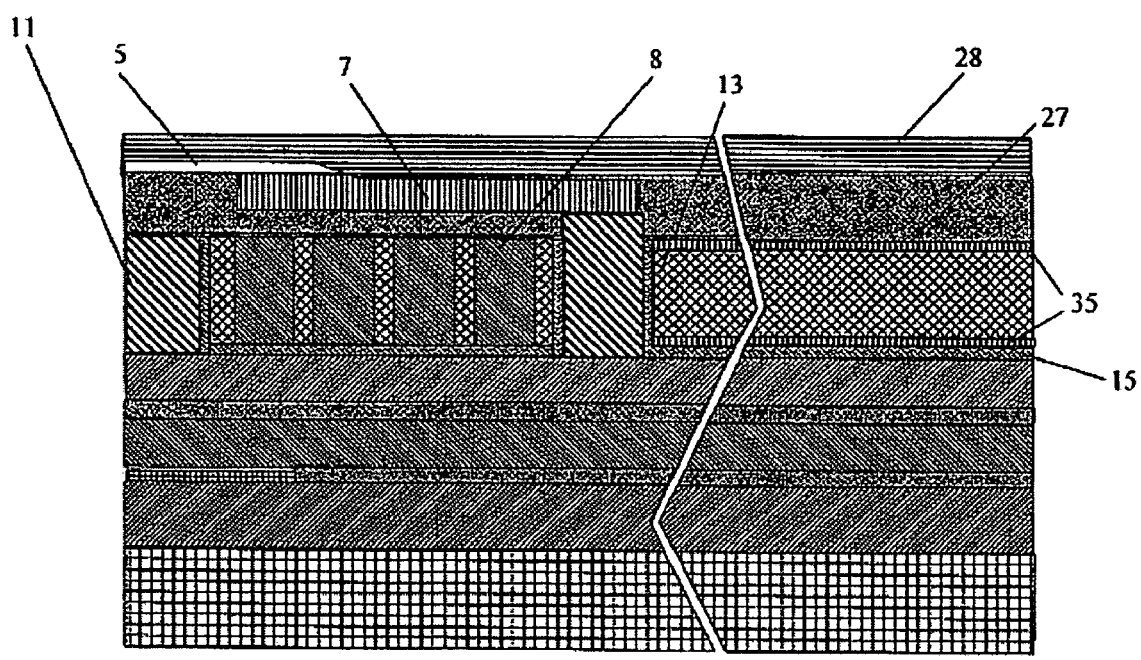
FIG. 13 is a sectional view of another example of the head of the present invention.

FIG. 13 is a sectional view of another example of the head of the present invention. The feature of this head is that an adhesion layer 35 is formed at the interface (leading side) between the $SiO_2$ coil insulating layer 13 arranged at a position away from the air bearing surface and the alumina insulating layer 15 and the interface (trailing side) between the $SiO_2$ coil insulating layer 13 and the flattening alumina 27. When an annealing temperature of 200° C. or higher is applied during the process forming step, cracking occurs on $SiO_2$ on alumina and alumina on $SiO_2$ due to a difference in thermal stress between $SiO_2$ and alumina, thereby causing a phenomenon that $SiO_2$ and alumina peel off from the head. To prevent this, the adhesion layer 35 is formed. The material of the adhesion layer is desirably a non-magnetic material such as Cu/Cr or Au/Cr or material such as $Al_2O_3$—$SiO_2$. The position of the adhesion layer is desirably on both trailing side and leading side of $SiO_2$ as the coil insulating layer 13 as shown in FIG. 13 but may be one side. The area of the adhesion layer is the same as that of the coil insulating layer 13 as shown in FIG. 14(a) or the entire area other than the coil pattern as shown in FIG. 14(b).

Figure 15:
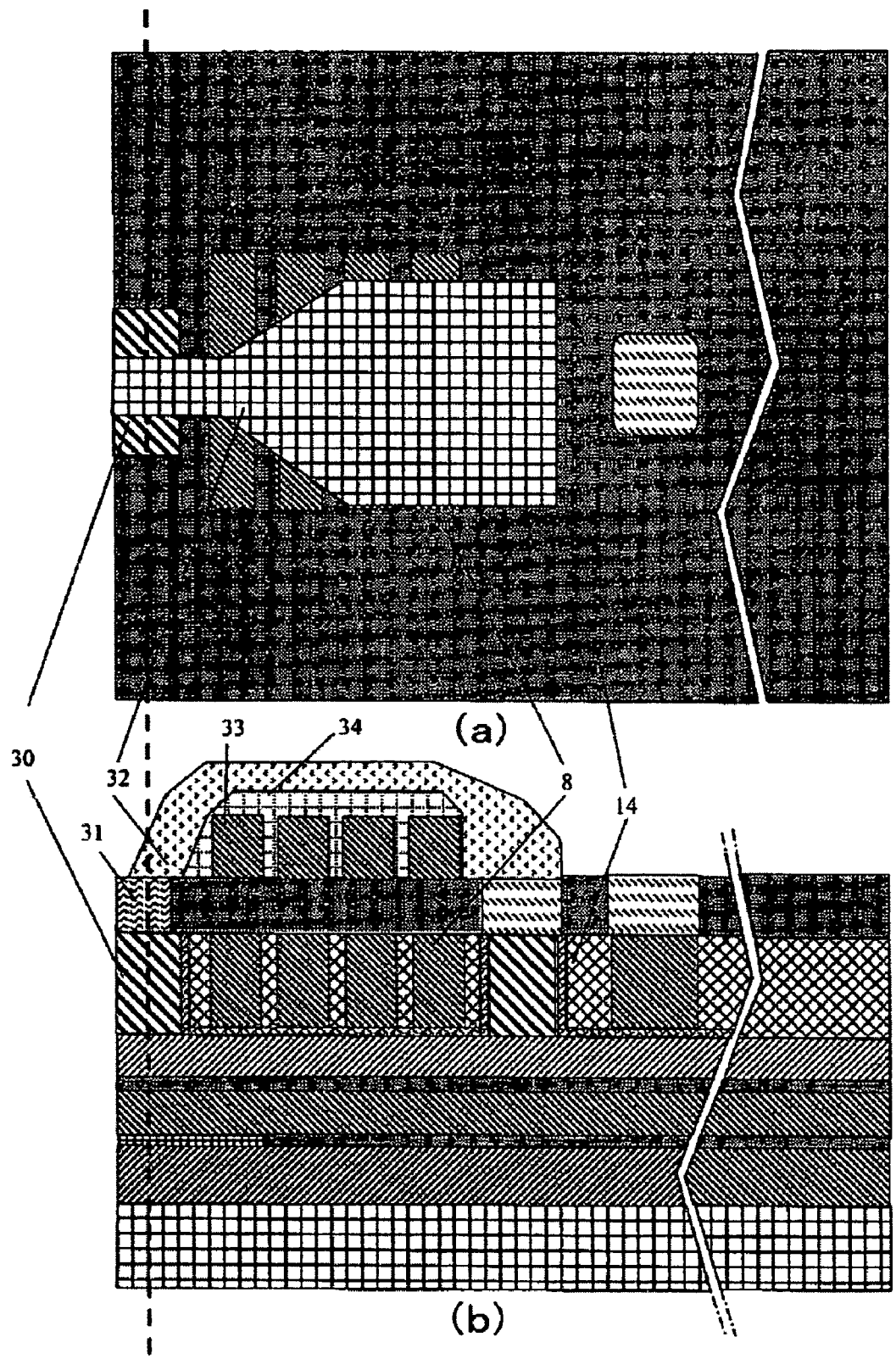
FIGS. 15(*a*) and 15(*b*) are sectional views of a head when the present invention is applied to a longitudinal magnetic write head.

The present invention can be applied to a longitudinal recording magnetic head. FIGS. 15(a) and 15(b) show an embodiment in which the present invention is applied to the coil of the first layer of a longitudinal recording head comprising a double-layer coil. FIG. 15(a) shows the head when seen from the trailing side and FIG. 15(b) is a sectional view of the head. In this embodiment, the first coil insulating layer is made of $SiO_2$. Thus, the present invention can be fully applied to the longitudinal recording magnetic head.

When not alumna but $SiO_2$ is exposed to the air bearing surface without applying the present invention, in the slider process, $SiO_2$ is chipped during the processing of the air bearing surface, thereby causing a problem. Therefore, the embodiment of the present invention is superior.

By mounting a low-resistance coil which has been manufactured by using a low expansion material such as $SiO_2$ and physical etching such as dry etching to a perpendicular recording magnetic head, the amounts of TPR caused by coil resistance and static temperature can be suppressed at the same time.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for manufacturing a magnetic head, comprising:
    forming a pedestal and a back gap on a return pole of a perpendicular magnetic write head;
    forming a first alumina layer on the pedestal and the back gap;
    forming a resist pattern in a coil forming area surrounding the back gap;
    forming a second alumina layer on the resist pattern and in the front side of the pedestal;
    exposing the resist pattern by polishing the second alumina layer and the resist pattern at the same time by CMP;
    replacing the exposed resist pattern by a $SiO_2$ layer as a coil insulator;
    forming a resist pattern for forming the coil on the $SiO_2$ layer;
    forming coil grooves in the $SiO_2$ layer by dry etching using the resist pattern for forming the coil as a mask; and
    forming the coil in the coil grooves.

2. The method for manufacturing a magnetic head according to claim 1, wherein forming the coil includes forming a Cu/Cr or Cu/Ta plating seed layer in the coil grooves and filling Cu in the coil grooves covered with the seed layer by damascene Cu plating.

3. The method for manufacturing a magnetic head according to claim 2, further comprising flattening the Cu filled coil grooves up to a top of the coil grooves by CMP and removing the plating seed layer.

4. The method for manufacturing a magnetic head according to claim 1, wherein replacing the exposed resist pattern with $SiO_2$ includes removing the exposed resist pattern, forming a $SiO_2$ layer, and polishing the $SiO_2$ layer by CMP to expose the pedestal and the back gap.

5. The method for manufacturing a magnetic head according to claim 4, further comprising forming an adhesion layer before and/or after forming the $SiO_2$ layer.

6. The method for manufacturing a magnetic head according to claim 5, wherein the adhesion layer is made of Cu/Cr, Ta or $Al_2O_3$—$SiO_2$.

* * * * *